(12) United States Patent
Jung et al.

(10) Patent No.: US 12,488,793 B2
(45) Date of Patent: Dec. 2, 2025

(54) CONVERSATION METHOD AND SYSTEM FOR OPERATING CONVERSATION MODELS ACCORDING TO THE PRESENCE OR ABSENCE OF RELATED KNOWLEDGE

(71) Applicant: Korea Electronics Technology Institute, Seongnam-si (KR)

(72) Inventors: Min Young Jung, Hwaseong-si (KR); Sa Im Shin, Seoul (KR); Jin Yea Jang, Seongnam-si (KR); San Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/704,593

(22) PCT Filed: Aug. 23, 2023

(86) PCT No.: PCT/KR2023/095049
§ 371 (c)(1),
(2) Date: Apr. 25, 2024

(87) PCT Pub. No.: WO2024/101975
PCT Pub. Date: May 16, 2024

(65) Prior Publication Data
US 2024/0420691 A1    Dec. 19, 2024

(30) Foreign Application Priority Data
Nov. 7, 2022 (KR) .......................... 10-2022-0147350

(51) Int. Cl.
*G10L 15/00* (2013.01)
*G10L 15/183* (2013.01)
(Continued)

(52) U.S. Cl.
CPC ............ *G10L 15/183* (2013.01); *G10L 15/22* (2013.01); *G10L 13/02* (2013.01); *G10L 15/16* (2013.01); *G10L 15/1822* (2013.01); *G10L 25/30* (2013.01)

(58) Field of Classification Search
CPC ......... G10L 15/07; G10L 15/20; G10L 15/26; G10L 15/22; G10L 15/30; G10L 15/02;
(Continued)

(56) References Cited

U.S. PATENT DOCUMENTS

| | | |
|---|---|---|
| 10,430,447 B2 * | 10/2019 | Canim .................. H04L 67/306 |
| 11,669,697 B2 * | 6/2023 | Hu .......................... G10L 13/027 704/9 |
| 11,908,463 B1 * | 2/2024 | Biswas ............... G10L 15/1815 |

FOREIGN PATENT DOCUMENTS

| | | |
|---|---|---|
| JP | 2022-95950 A | 6/2022 |
| KR | 10-0807307 B1 | 2/2008 |

* cited by examiner

*Primary Examiner* — Vu B Hang
(74) *Attorney, Agent, or Firm* — NSIP Law

(57) ABSTRACT

There is provided a conversation method and system for operating a conversation model according to the presence or absence of related knowledge. A conversation method according to an embodiment may receive an input of a user utterance, may determine a conversation model based on an inputted user utterance content, may create a conversation content by using the determined conversation model, and may convert the created conversation content into a voice, and may output the voice. Accordingly, different conversation models may be operated according to the presence or absence of related knowledge, so that an empathic conversation may be generated instead of generating an inappropriate response in a knowledge-based conversation, and user's satisfaction on a conversation may be enhanced.

14 Claims, 3 Drawing Sheets

(51) Int. Cl.
*G10L 15/22* (2006.01)
*G10L 13/02* (2013.01)
*G10L 15/16* (2006.01)
*G10L 15/18* (2013.01)
*G10L 25/30* (2013.01)

(58) Field of Classification Search
CPC ....... G10L 15/063; G10L 15/08; G10L 15/14; G10L 15/1815; G10L 15/197; G10L 15/1822; G10L 15/183; G10L 15/193; G10L 15/19; G10L 21/0208; G10L 25/78; G10L 25/87; G10L 25/27; G10L 25/30; G10L 15/16; G10L 19/005; G10L 19/00; G10L 15/10

See application file for complete search history.

CONVERSATION METHOD AND SYSTEM FOR OPERATING CONVERSATION MODELS ACCORDING TO THE PRESENCE OR ABSENCE OF RELATED KNOWLEDGE

CROSS REFERENCE TO RELATED APPLICATIONS

This application is a U.S. National Stage Application of International Application No. PCT/KR2023/095049, filed on Aug. 23, 2023, which claims the benefit under 35 USC 119 (a) and 365(b) of Korean Patent Application No. 10-2022-0147350, filed on Nov. 7, 2022, in the Korean Intellectual Property Office, the entire disclosure of which is incorporated herein by reference for all purposes.

TECHNICAL FIELD

The disclosure relates to an artificial intelligence (AI) technology, and more particularly, to an AI-based conversation method and apparatus which performs a conversation with a user by using a conversation model.

BACKGROUND ART

A related-art AI-based conversation system may use only one conversation model or may classify domains according to knowledge and may operate conversation models for respective domains in order to have an enriched and exact conversation.

However, even if domains are classified by knowledge, it is impossible to respond to all of user's questions completely and appropriately. In some cases, rather than a knowledge-based conversation, an emotion-based conversation may be appropriate, but measures to solve this may be insufficient.

Meanwhile, operating conversation models according to knowledge domains may require much cost and time since conversation models should be developed, trained, and updated.

DISCLOSURE

Technical Problem

The disclosure has been developed in order to address the above-discussed deficiencies of the prior art, and an object of the disclosure is to provide a conversation method and system which operates different types of conversation models according to the presence or absence of related knowledge, as a solution for reducing the possibility of generation of an inappropriate response in a knowledge-based conversation.

Technical Solution

According to an embodiment of the disclosure to achieve the above-described object, a conversation method may include: a step of receiving an input of a user utterance; a step of determining a conversation model based on an inputted user utterance content; a step of creating a conversation content by using the determined conversation model; and a step of converting the created conversation content into a voice, and outputting the voice.

The step of determining may be performed in the unit of a user utterance. The step of determining may include determining one of a first conversation model which is an AI model that is trained to generate a response by using a user utterance content and knowledge related to the user content, and a second conversation model which is an AI model that is trained to generate a response by using only a user utterance content.

The second conversation model may be a conversation model that generates a response for empathizing with a user utterance.

According to an embodiment of the disclosure, the conversation method may further include a step of extracting related knowledge based on the inputted user utterance content, and the step of determining may include: a step of selecting one piece of related knowledge that has a highest degree of association from the extracted related knowledge; and a step of selecting a conversation model based on the degree of association of the selected related knowledge.

The step of selecting the conversation model may include, when the degree of association of the selected related knowledge is greater than or equal to a reference value, selecting the first conversation model. The step of selecting the conversation model may include, when the degree of association of the selected related knowledge is less than the reference value, selecting the second conversation model. The reference value may vary based on a result of selecting a previous conversation model.

The first conversation model and the second conversation model may not be subdivided by conversation domains.

According to another embodiment of the disclosure, a conversation system may include: an input unit configured to receive an input of a user utterance; a conversation module configured to determine a conversation model based on an inputted user utterance content, and to create a conversation content by using the determined conversation model; and an output unit configured to convert the created conversation content into a voice, and to output the voice.

According to still another embodiment of the disclosure, a conversation method may include: a step of determining a conversation model based on a user utterance content; and a step of creating a conversation content by using the determined conversation model.

According to yet another embodiment of the disclosure, there is provided a computer-readable recording medium having a program recorded thereon to perform a conversation method, the conversation method including: a step of determining a conversation model based on a user utterance content; and a step of creating a conversation content by using the determined conversation model.

Advantageous Effects

As described above, according to embodiments of the disclosure, different conversation models may be operated according to the presence or absence of related knowledge, so that an empathic conversation may be generated instead of generating an inappropriate response in a knowledge-based conversation, and user's satisfaction on a conversation may be enhanced.

According to embodiments of the disclosure, a knowledge conversation model need not be generated/operated for each domain, and cost, time, and effort required to develop, train, update a conversation model may be reduced.

BEST MODE

Hereinafter, the disclosure will be described in more detail with reference to the drawings.

Embodiments of the disclosure provide a conversation method/system which operates different types of conversation models according to the presence or absence of related knowledge. The disclosure relates to a method/system which is capable of responding by using user utterance-based related knowledge, and providing a response for appropriately empathizing with user's utterance without using knowledge.

Compared to related-art methods of classifying knowledge domains and determining a particular conversation model, a method according to an embodiment of the disclosure may determine whether to generate a knowledge-based conversation or an empathic conversation without knowledge, based on a result of extracting related knowledge.

Figure 1:
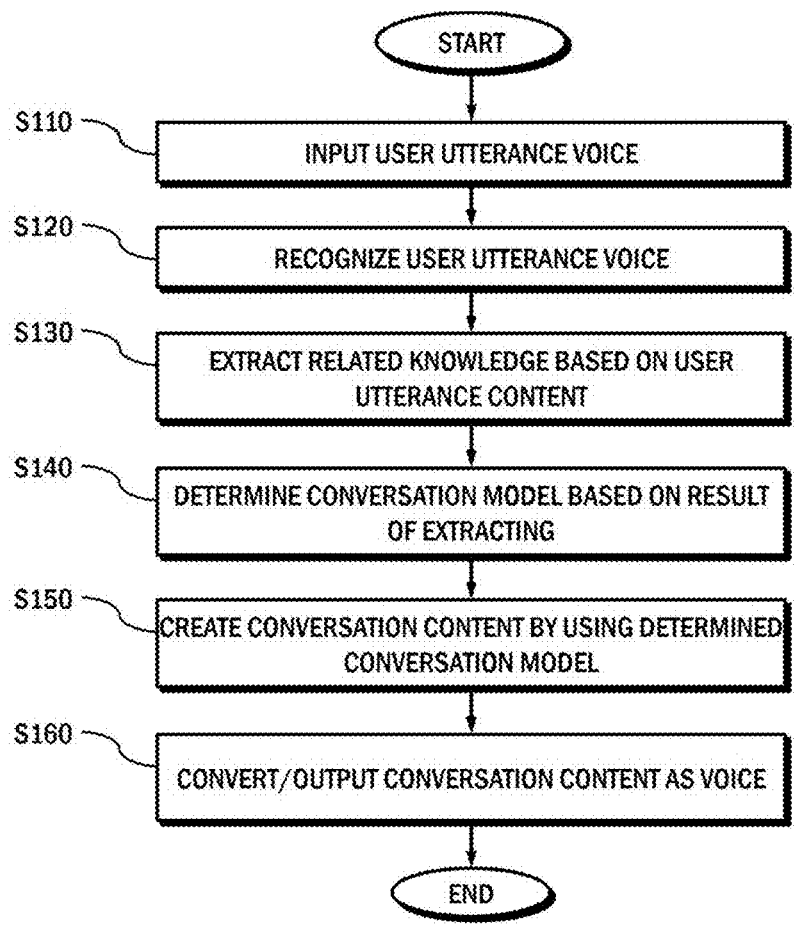
FIG. 1 is a flowchart provided to explain an AI-based conversation method according to an embodiment of the disclosure.

FIG. 1 is a flowchart provided to explain an AI-based conversation method according to an embodiment of the disclosure. In a conversation method according to an embodiment, different conversation models may be operated with reference to the presence or absence of related knowledge.

To achieve this, user's utterance may be inputted (S110), and the inputted user utterance voice may be recognized and may be converted into a text (S120).

Based on a user utterance content acquired through steps S110 and S120, related-knowledge may be extracted (S130). At step S130, knowledge may be extracted by using a pre-owned knowledge database (DB), a knowledge DB established on a web, or the like.

Based on the result of extracting at step S130, a conversation model for keeping the conversation with the user may be determined (S140). Conversation models determined at step S140 may be classified into two types of conversation models as follows:

One conversation model may be an AI model that is trained to generate a response by using a "user utterance content obtained through steps S110 and S120" and "knowledge related to the utterance content which is obtained at step S130", and is referred to as a knowledge conversation model.

The other conversation model may be an AI model that is trained to generate a response by using only a "user utterance content obtained through steps S110 and S120" without using "knowledge related to the utterance content which is obtained through step S130". This conversation model may be a conversation model for generating a response for empathizing with a user utterance, and is referred to as an empathic conversation model.

The empathic conversation model may generate an agreeable response to respond to user's utterance shortly and quickly. The aggregable response may be a response expressing 'continual', 'understanding', 'agreement', 'emotional response', 'empathic response'.

The empathic conversation model may not be sub-divided according to conversation domains. Likewise, the knowledge conversation model may not be sub-divided according to conversation domains, and may be implemented as one model.

At step S140, a conversation model may be determined in the unit of a user utterance. This means that a conversation model may vary every time a user utters. For example, the knowledge conversation model may be used when a conversation continues, and, at some time, the empathic conversation model may be used. The conversation model may be changed depending on related knowledge extracted at step S130, which will be described below with reference to FIG. 2.

Thereafter, a conversation content may be created by using the conversation model determined at step S140 (S150), and the created conversation content may be converted into a voice and the voice may be outputted (S160).

Figure 2:
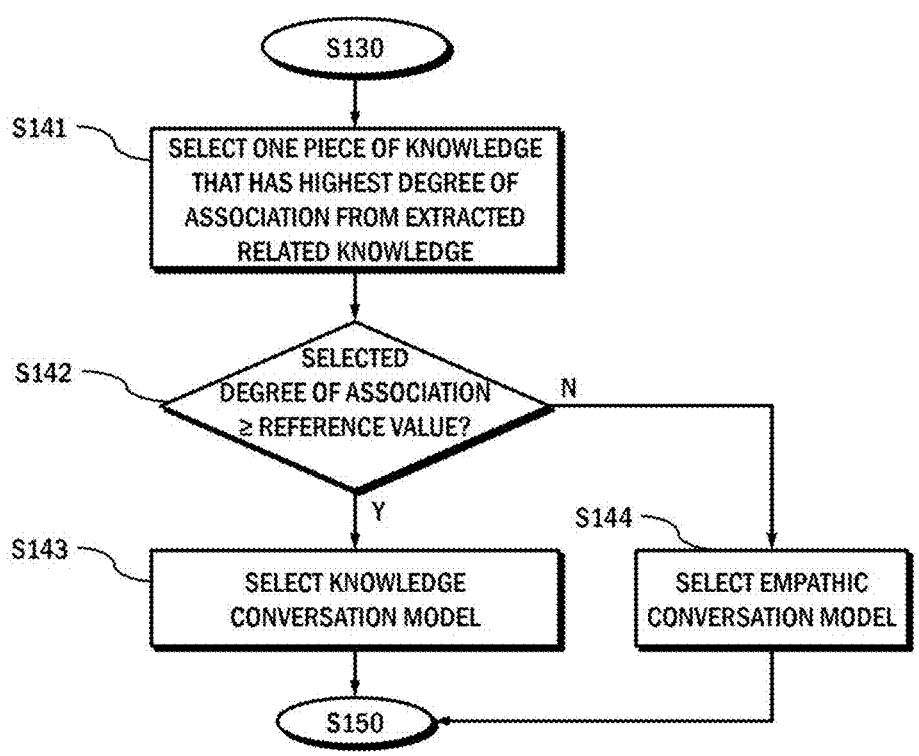
FIG. 2 is a detailed flowchart of step S140 of FIG. 1.

Hereinafter, step S140 of determining a conversation model will be described in detail with reference to FIG. 2. FIG. 2 is a detailed flowchart of step S140 of FIG. 1.

As shown in the drawing, one piece of knowledge that has a highest degree of association may be selected from related knowledge extracted at step S130 of FIG. 1 in order to determine a conversation model (S141).

In extracting related knowledge based on a user utterance content at step S130 of FIG. 1, a degree of association between knowledge and an utterance content may be proposed as a probability value. As a probability value is higher, a degree of association between a user utterance content and knowledge is higher, and reversely, as a probability is lower, a degree of association between a user utterance content and knowledge is lower.

The degree of association of the knowledge selected at step 141 may be compared with a reference value (S142). When the degree of association is greater than or equal to the reference value as a result of comparing (S142—Y), the knowledge conversation model may be selected (S143). This is because there is knowledge that is highly associated with the user utterance and an appropriate response that is desired by a user may be generated based on the knowledge.

On the other hand, when the degree of association is less than the reference value as a result of comparing (S142—N), the empathic conversation model may be selected (S144). This is because there is no knowledge that is highly associated with the user utterance and a somewhat wrong response may be generated when the response is generated based on the knowledge.

Up to now, a conversation method which operates a conversation model according to the presence or absence of related knowledge has been described in detail with reference to preferred embodiments.

In extracting knowledge at step S130 of FIG. 1, reference may be made to a conversation history including previous utterance contents in addition to a user's latest utterance content, and in this case, related knowledge having a higher degree of association may be extracted.

This may be applied when a conversation content is created at step S150. That is, not only a user's latest utterance content but also a previous conversation history may be inputted to a conversation model to create a next conversation content.

The reference value for comparing a degree of association of knowledge at step S142 to determine a conversation model may be implemented to vary based on a result of selecting a previous conversation model. For example, when a knowledge conversation model has been selected in a previous conversation, the reference value may decrease so that the possibility of doing a knowledge conversation increases. On the other hand, when an empathic conversation model has been selected in the previous conversation, the reference value may increase so that the possibility of doing an empathic conversation increases.

Typically, persons' conversation contents tend not to change suddenly. That is, once a knowledge-based conversation starts, the knowledge-based conversation may continue for a while, and, when the conversation changes to an empathic conversation, the empathic conversation may tend to continue for a while. The method of the disclosure reflects this tendency.

Figure 3:
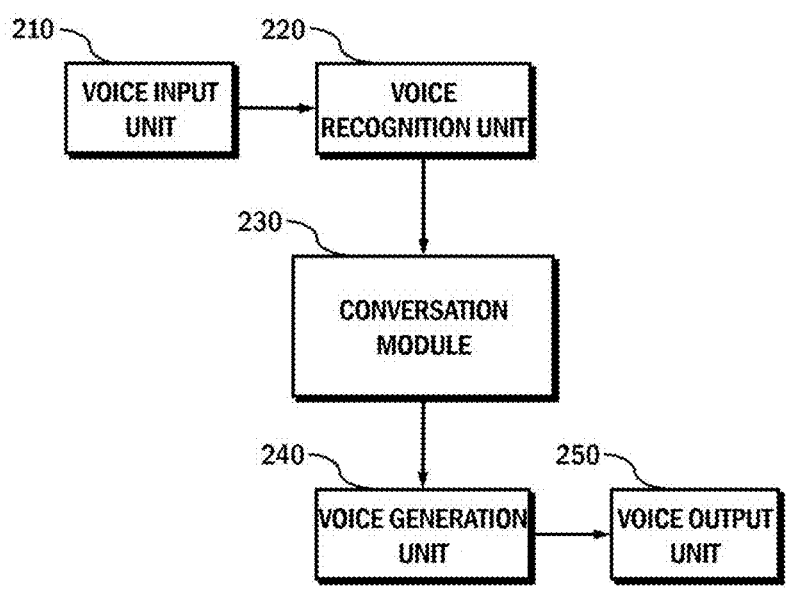
FIG. 3 is a view illustrating a configuration of an AI-based conversation system according to another embodiment of the disclosure.

FIG. 3 is a view illustrating a configuration of an AI-based conversation system according to another embodiment of the disclosure. As shown in the drawing, the conversation system according to an embodiment may include a voice input unit 210, a voice recognition unit 220, a conversation module 230, a voice generation unit 240, and a voice output unit 250.

The voice input unit 210 may be a microphone to receive an input of a user's uttered voice, and the voice recognition unit 220 may be a speech-to-text conversion module that recognizes the uttered voice inputted through the voice input unit 210 and converts the voice into a text.

The conversation module 230 may extract related knowledge based on a user utterance content outputted from the voice recognition unit 220, may determine a conversation model to continue a conversation with the user based on the result of extracting, and may create a conversation content by using the determined conversation model. A detailed method for determining a conversation model is illustrated in FIG. 2.

The voice generation unit 240 may convert the conversation content outputted from the conversation module 230 into a voice signal. The voice output unit 250 may be a speaker to output the voice signal generated in the voice generation unit 240.

Up to now, a conversation method which operates a conversation model according to the presence or absence of related knowledge has been described in detail with reference to preferred embodiments.

In embodiments of the disclosure, the possibility of generating an inappropriate response in a knowledge-based conversation may be reduced, and, considering difficulty in establishing and operating a conversation model appropriate for all conversation purposes, conversation models may be classified according to types of conversations, but a knowledge conversation model may not be sub-divided according to domains.

As proposed in embodiments of the disclosure, when an empathic response is generated instead of generating an inappropriate response in a knowledge-based conversation, user's satisfaction may be enhanced, and conversation models may be classified according to types of conversations, so that each model may be easily updated in terms of learning time and performance.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the disclosure have been illustrated and described, the disclosure is not limited to the above-described specific embodiments. Various changes can be made by a person skilled in the art without departing from the scope of the disclosure claimed in claims, and also, changed embodiments should not be understood as being separate from the technical idea or prospect of the disclosure.

The invention claimed is:

1. A conversation method comprising:
   receiving, as an input, a user utterance;
   extracting related knowledge based on a user utterance content of the received and inputted user utterance;
   selecting one piece of related knowledge, that has a highest degree of association with the user utterance content, from among the extracted related knowledge;
   selecting one of a first conversation model which is an Artificial Intelligence (AI) model that is trained to generate a conversation content by using a user utterance content of training data and knowledge related to the user utterance content of the training data, and a second conversation model which is an AI model that is trained to generate a response by using only a user utterance content of the training data, based on a degree of association of the selected related knowledge with the user utterance content;
   creating a conversation content by using the selected conversation model; and
   converting the created conversation content into a voice, and outputting the voice,
   wherein the selecting one of the first conversation model and the second conversation model is performed based on comparing the degree of association of the selected related knowledge with the user utterance content with a reference probability value, and
   the reference probability value is adjusted based on a result of selecting a previous conversation model for creating a previous conversation content.

2. The conversation method of claim 1, wherein the selecting the knowledge and selecting the conversation model are performed in the unit of the user utterance.

3. The conversation method of claim 1, wherein the second conversation model is a conversation model that generates a response for empathizing with the user utterance.

4. The conversation method of claim 1, wherein the selecting the conversation model comprises, when the degree of association of the selected related knowledge is greater than or equal to the reference probability value, selecting the first conversation model.

5. The conversation method of claim 4, wherein the selecting the conversation model comprises, when the degree of association of the selected related knowledge with the user utterance content is less than the reference probability value, selecting the second conversation model.

6. The conversation method of claim 1, wherein the first conversation model and the second conversation model are not subdivided by conversation domains.

7. A conversation system comprising:
   one or more processors comprise:
   an input unit configured to receive, as an input, a user utterance;
   a conversation module configured to:
   extract related knowledge based on a user utterance content of the received and inputted user utterance;

select one piece of related knowledge, that has a highest degree of association with the user utterance content, from among the extracted related knowledge;

select one of a first conversation model which is an Artificial Intelligence (AI) model that is trained to generate a conversation content by using a user utterance content of training data and knowledge related to the user utterance content of the training data, and a second conversation model which is an AI model that is trained to generate a response by using only a user utterance content, based on a degree of association of the selected related knowledge with the user utterance content of the training data; and create a conversation content by using the selected conversation model; and an output unit configured to convert the created conversation content into a voice, and to output the voice, wherein the selecting one of the first conversation model and the second conversation model is performed based on comparing the degree of association of the selected related knowledge with the user utterance content with a reference probability value, and the reference probability value is adjusted based on a result of selecting a previous conversation model for creating a previous conversation content.

8. A conversation method comprising:

extracting related knowledge based on a user utterance content being received and inputted;

selecting one piece of related knowledge, that has a highest degree of association with the inputted user utterance content, from among the extracted related knowledge;

selecting one of a first conversation model which is an Artificial Intelligence (AI) model that is trained to generate a conversation content by using a user utterance content of training data and knowledge related to the user utterance content of the training data and a second conversation model which is an AI model that is trained to generate a response by using only a user utterance content of the training data, based on a degree of association of the selected related knowledge with the inputted user utterance content; and creating a conversation content by using the selected conversation model, wherein the selecting one of the first conversation model and the second conversation model is performed based on comparing the degree of association of the selected related knowledge with the user utterance content with a reference probability value, and the reference probability value is adjusted based on a result of selecting a previous conversation model for creating a previous conversation content.

9. A computer-readable non-transitory recording medium having a program recorded thereon for executing the method of claim 8 on a computer.

10. The conversation system of claim 7, wherein the selecting the one piece of related knowledge and the selecting the conversation model are performed in the unit of the user utterance.

11. The conversation system of claim 7, wherein the second conversation model is a conversation model that generates a response for empathizing with the user utterance.

12. The conversation system of claim 7, wherein, for the selecting the conversation model, the one or more processors are configured to, when the degree of association of the selected related knowledge is greater than or equal to the reference probability value, select the first conversation model.

13. The conversation system of claim 12, wherein, for the selecting the conversation model, the one or more processors are configured to, when the degree of association of the selected related knowledge with the user utterance content is less than the reference probability value, select the second conversation model.

14. The conversation system of claim 7, wherein the first conversation model and the second conversation model are not subdivided by conversation domains.

* * * * *